S. GOULD.
Grass Huller.
8995X
Patented Aug. 15, 1835.
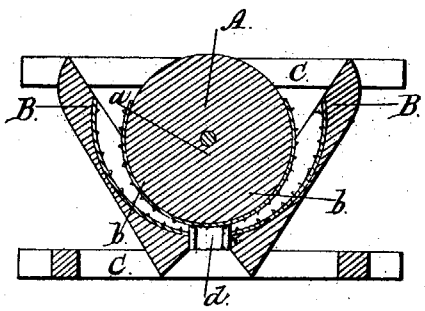
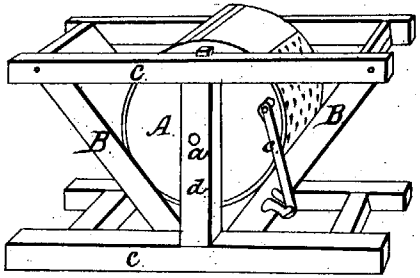
N. PETERS, Photo-Lithographer, Washington, D. C.

8995X

Aug. 15. 1835

Samuel Gould Junr. of New Portland, State of Maine

Letters Patent.

The schedule referred to in these Letters Patent and making part of the same, containing a description in the words of the said Samuel Gould Jr. himself of his improve-ment in the machine for separating and removing the hull or bowls from grass seed.

To all to whom these presents shall come

Know ye, that I Samuel Gould Junr. of New Portland in the County of Somerset, and State of Maine, have invented a new and useful improvement in the machine for separating and removing the hull or bowl from grass seed, rice and other seeds, which I denominate the vibrating Machine, and the following is a full and accurate description of the constru-ction and operation of said Machine. A horizontal cylin-der or semi-cylinder three feet long and six feet in diameter or in that proportion. the surface of which is covered with sheet iron perforated with small orifices, like a grater through the centre of which passes a shaft to which the cylinder is made fast, plays or vibrates in a curb lined with sheet iron perforated in the same manner, this curb is a hollow segment, or when a whole cylinder is used, is made of two hollow segments. and is made of a size proportionate to the dimensions of the cylinder This shaft revolves in boxes made in two upright posts as represented in the accompanying drawings, the curb is to be made of plank or some other suitable mate-rial, The cylinder and curb have one or more groov-ves the top of the curb to increase the feed of the machine The cylinder is to be set in motion by a crank, attached 190. 8995X to it near the one extremity of the cylinder, and the sweep is attached to the crank of a wheel which can be carried by any power sufficient to move the cylinder The seed is to be thrown into the curb, and the hull is to be scoured or separated by the friction, between the cylinder and curb, The general form of the Machine may be seen by the accompanying drawings which are made a part of this specification, What I claim as new, and of my own invention, is the horizontal vibrating cylinder and the general form and arrangement of the several parts of the Machine, to effect the purpose designed In witness of which I have hereunto set my hand this 24th day of June 1835

Witnesses
[illegible] Young. [illegible]
[illegible] R. [illegible]

Samuel Gould Junr.

Exd
[illegible]

(Drawing.)

(450 words)